(12) United States Patent
Panchaksharaiah et al.

(10) Patent No.: US 12,316,907 B2
(45) Date of Patent: May 27, 2025

(54) SYSTEMS AND METHODS FOR AUTOMATICALLY GENERATING CONTENT ITEMS FROM IDENTIFIED EVENTS

(71) Applicant: Adeia Guides Inc., San Jose, CA (US)

(72) Inventors: Vishwas Sharadanagar Panchaksharaiah, Karnataka (IN); Vikram Makam Gupta, Karnataka (IN); Rupayan Dutta, Pin (IN); Sukanya Agarwal, Haryana (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 536 days.

(21) Appl. No.: 17/713,474

(22) Filed: Apr. 5, 2022

(65) Prior Publication Data
US 2023/0319346 A1    Oct. 5, 2023

(51) Int. Cl.
    H04N 21/44    (2011.01)
    G06F 16/783   (2019.01)
    H04L 65/612   (2022.01)
    H04N 21/218   (2011.01)
    H04N 21/482   (2011.01)

(52) U.S. Cl.
    CPC ..... *H04N 21/44008* (2013.01); *G06F 16/783* (2019.01); *H04L 65/612* (2022.05); *H04N 21/21805* (2013.01); *H04N 21/4828* (2013.01)

(58) Field of Classification Search
    None
    See application file for complete search history.

(56) References Cited

U.S. PATENT DOCUMENTS

| | | | |
|---|---|---|---|
| 10,511,889 B2* | 12/2019 | Dietz | H04N 21/4532 |
| 2016/0212054 A1* | 7/2016 | Howard | H04L 65/80 |
| 2016/0381109 A1 | 12/2016 | Barnett et al. | |
| 2017/0142480 A1* | 5/2017 | Gupta | H04N 13/167 |
| 2017/0332036 A1* | 11/2017 | Panchaksharaiah | H04N 5/45 |
| 2020/0053401 A1* | 2/2020 | Obara | H04N 21/23418 |
| 2020/0252680 A1* | 8/2020 | Panchaksharaiah | G06F 9/542 |
| 2022/0174354 A1* | 6/2022 | Dhiman | H04N 21/6473 |

OTHER PUBLICATIONS

"3rd Gen. Partnership Project; Technical Spec. Grp Services & System Aspects; Packet-switched Streaming Service; Improved Support for Dynamic Adaptive Streaming over HTTP in 3GPP (Release 12)," https://www.3gpp.org/ftp/ isg_sa/WG4_CODEC/TSGS4_80/DOCS.

* cited by examiner

*Primary Examiner* — Junior O Mendoza
(74) *Attorney, Agent, or Firm* — Haley Guiliano LLP

(57) ABSTRACT

Systems and methods are provided for generating a second content item on identifying an event in a first content item. A first content item is received, and the first content item is monitored to identify a change in a factor associated with the first content item. It is determined whether the change in factor is greater than a threshold value. Based on the change in the factor, an event is identified in the first content item. A second content item is generated, wherein the second content item is based on the identified event in the first content item. The first content item and a user interface element are generated for display at a computing device, wherein the user interface element is configured to receive an input and is associated with the second content item. In response to receiving an input, the second content item is generated for output.

18 Claims, 11 Drawing Sheets

EXTM3U

EXT-X-MEDIA:TYPE=VIDEO,GROUP-ID="750kbs",NAME="overhead",AUTOSELECT=YES,DEFAULT=YES

EXT-X-MEDIA:TYPE=VIDEO,GROUP-ID="750kbs",NAME="highsky",AUTOSELECT=YES,DEFAULT=NO,URI="highsky/750kbs/prog_index.m3u8"

EXT-X-MEDIA:TYPE=VIDEO,GROUP-ID="750kbs",NAME="skycam",AUTOSELECT=YES,DEFAULT=NO,URI="skvcam/750kbs/prog_index.m3u8"

EXT-X-MEDIA:TYPE=AUDIO,GROUP-ID="aac",LANGUAGE="en",NAME="English",AUTOSELECT=YES,DEFAULT=YES,URI="eng/prog_index.m3u8"

EXT-X-STREAM-INF:PROGRAM-ID=1,BANDWIDTH=xxxxxx,CODECS="mp4a.40.2,avc1.4d401e",VIDEO="500kbs",AUDIO="aac"

overhead/750kbs/prog_index.m3u8

FIG. 7

SYSTEMS AND METHODS FOR AUTOMATICALLY GENERATING CONTENT ITEMS FROM IDENTIFIED EVENTS

BACKGROUND

The present disclosure is directed towards systems and methods for generating a second content item on identifying an event in a first content item. In particular, systems and methods are provided herein for identifying an event in a first content item based on a change in a factor associated with the content item, generating a second content item based on the event, and generating a user interface element associated with the second content item.

SUMMARY

With the proliferation of over-the-top (OTT) platforms like ESPN+ and YouTube, there has been an increase in the number of platforms that enable events, such as sports events, to be transmitted via, for example, streaming to a wide variety of computing devices including, for example, smart televisions, smartphones and/or tablets. As these computing devices tend to be connected to the internet, providers increasingly transmit additional data to a computing device that is receiving a stream of an event. For example, if a computing device is receiving a stream of a football game, and a touchdown is scored, then a provider may transmit additional content based on the touchdown to the computing device. For example, the provider may curate and transmit, to the computing device, textual information about the person who scored and/or a short replay clip of the touchdown. However, this additional content takes time to curate, and it may no longer be relevant by the time it is received at the computing device. As a user of the computing device will ultimately discard/skip content that is not relevant, network bandwidth, storage resources and/or processing resources will be wasted during the delivery of additional content that is not relevant.

To overcome these problems, systems and methods are provided herein for generating a second content item on identifying an event in a first content item. In particular, systems and methods are provided herein for identifying an event in a first content item based on a change in a factor associated with the content item, generating a second content item based on the event, and generating a user interface element associated with the second content item.

Systems and methods are described herein for performing an action associated with a recommendation at a computing device. In accordance with some aspects of the disclosure, a method is provided. The method includes receiving a first content item and monitoring the first content item to identify a change in a factor associated with the first content item. It is determined whether the change in factor is greater than a threshold value and, if so, an event in the first content item is identified, based on the change in the factor. A second content item, based on the identified event in the first content item, is generated. The first content item and a user interface element are generated for display at a computing device, the user interface element configured to receive an input and associated with the second content item and, in response to receiving an input, the second content item is generated for output.

In an example system, a user uses a smartphone to stream a football game from a server. The football game may be monitored at a server to identify a change in factor greater than a threshold value. In some example systems, the monitoring may comprise monitoring the sound of a live crowd at the football game, and the factor may be the noise of the crowd. An event may be identified based on whether the noise of the crowd rises above a threshold loudness. In another example, the monitoring may be performed locally, at the computing device, via a trained algorithm. The algorithm may be trained to identify a relevant factor in order to aid with identifying an event. In some examples, the computing device may comprise an artificial intelligence accelerator chip, such as a Google Tensor chip, or a Samsung Exynos chip. On identifying an event, a second content item may be generated based on the event. For example, a short clip of the event may be generated. In some examples, the short clip may be a variable amount of time, such as five seconds, 14 seconds, 30 seconds, 52 seconds or one minute and 12 seconds. In other examples, the short clip may be shorter than a fixed amount of time, such as 25 seconds. In another example, the short clip may be a fixed amount of time, such as one minute. The short clip may be generated at, for example, a server, and may be transmitted to the computing device. In other examples, the short clip may be generated, and optionally stored, at the computing device. An overlay may be generated at the computing device, that overlays the first content item. This overlay may comprise a user interface element for receiving input. The user interface element may, for example, comprise a selectable icon (or other element) and the text "Watch Touchdown." On receiving an input associated with the user interface element, the second content item may be generated for display. In some examples, the first content item may continue playing in the background while the second content item is being displayed. In other examples, the first content item may be paused while the second content item is being displayed. In some examples, an action may be taken with respect to the first content item based on the length of the second content item. For example, if the second content item is 50 seconds long and the computing device can only store 30 seconds of content in a buffer, then the first content item may not be paused. In some examples, the user interface element can be invoked, or receive an input, to perform an action related to the second content item (e.g., play the second content item). In other examples, an input associated with the user interface element can be associated with the main content item. In further examples, the user interface element can receive input associated with both the first content item and the second content item.

Generating the second content item may further comprise identifying, in a manifest file, at least one segment of the first content item for saving locally. The manifest file may be generated, and the manifest file may comprise one or more links to one or more segments of the first content item and a tag associated with at least one of the one or more links. The tag may indicate that the segment may be locally saved. The manifest file may be received at the computing device.

A manifest file may be received at the computing device before an event in the first content item is identified, and the manifest file may comprise one or more links to one or more segments of the first content item. Generating the second content item may comprise identifying, in an updated manifest file, at least one segment of the first content item for saving locally. An updated manifest file may be generated, where the updated manifest file may comprise a tag for indicating that at least a portion of the first content item may be locally saved. The updated manifest file may be received at the computing device.

Generating the second content item may comprise identifying a third content item associated with the event, where the third content item may comprise a capture of the event from a different camera angle from the first content item, and the second content item is based on the event in the third content item. Camera angles associated with the first content item and the third content item may be identified via a manifest file received at the computing device. A preference for a camera angle may be received at the computing device, and the first content item may comprise a capture of the event from a first camera angle, where the first content item comprises a tag indicating the first camera angle. A third content item comprising a capture of the event from a second camera angle may be identified, where the third content item comprises a tag indicating the second camera angle. The tags associated with each of the first and third content items may be compared to the preference. One of the first and third content items may be identified based on the comparing, and the second content item may be generated based on the identified first or third content item.

A replay of the event may be identified in the first content item and, on identifying a replay, the generation of a content item may be prevented based on the replay. In response to receiving the input, the second content item may be generated for display at a second computing device. In response to receiving the input, an advertisement may be identified in the first content item. Generating the second content item for output may comprise generating the second content item for output in place of at least a part of the identified advertisement.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 7 shows a portion of an example data structure for use in generating a second content item for display on identifying an event in a first content item;

DETAILED DESCRIPTION

Figure 1:
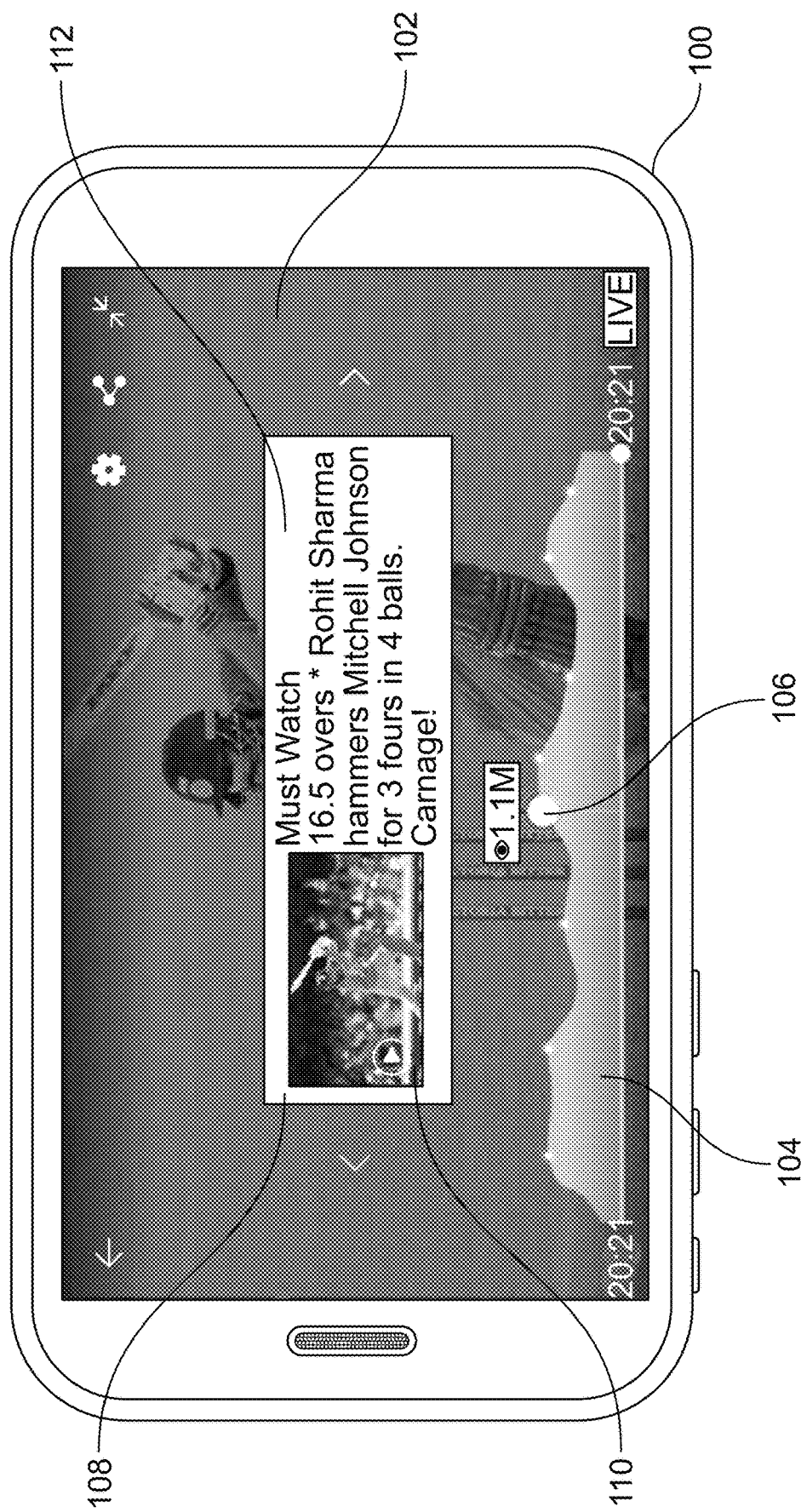
FIG. 1 shows an example environment in which a second content item is generated for display on identifying an event in a first content item.

Systems and methods are described herein for generating a second content item on identifying an event in a first content item. A content item includes audio, video, text and/or any other media content. Audio includes audio-only content, such as podcasts. Video includes audiovisual content such as movies and/or television programs. Text includes text-only content, such as event descriptions. A media content item may comprise a number of portions, or chapters. These portions may be identified in metadata associated with the media content item and may include titles and/or descriptions related to the content of the portion. The media content item may be of any suitable known format. One example of a suitable media content item is one that complies with the MPEG DASH standard. An over-the-top (OTT) content platform and/or a content streaming platform may be accessed via a website and/or an app running on a computing device and may receive any type of content item, including live content items and/or on-demand content items. Content items may, for example, by streamed to physical computing devices. In another example, content items may, for example, be streamed to virtual computing devices in, for example, a virtual environment and/or the metaverse.

"Factor" is a broad term that covers anything that can change in a quantifiable manner in order to indicate an event in a content item. For example, a factor can include the an instantaneous number of viewers of a content item; how often a segment of a content item is re-watched (for example, by monitoring rewind requests from a media player); a change in sound of a crowd at, for example, a broadcast game; viewers local to a computing device clapping and/or making noise; a change in a number and/or rate of online comments; and/or detection of events, such as key plays, via computer vision and/or content analysis during, for example, a game. An event may comprise a key play in a game. Such an event, or any other event, can be identified by analyzing a source that includes real-time scores and determining a change in score. A change in score can be an indication of an event (e.g., a goal or a touch down). Additionally, in some examples, graphic text (including scores, team statistic cards and/or player statistic cards) may be overlaid on top of the first content item, and this graphic text may be analyzed to determine whether an event has occurred. In some examples, real-time action recognition can be performed to identify an event by analyzing video frames using technologies such as machine learning and/or computer vision. One or more features from one or more frames in a content item can be extracted, and tags can be created that correspond to objects and/or actions that are used by trained machine learning models to identify one or more frames that include events (including events comprising key plays) that, for example, comprise touch downs and/or strikes.

"Event" is broad term that includes any occurrence in a content item that may be of interest to a viewer. For example, in a sports content item, it may comprise a goal, touchdown, a foul, a key play, an interception and/or a wicket. In an e-sport content item, it may comprise a headshot, a fastest lap and/or a crate opening event. In a music content item, it may comprise a well-known song being played. In a nature content item, it may comprise a rare animal being shown. In a gameshow content item, it may comprise a contestant correctly answering a difficult question.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an example environment in which a second content item is generated for display on identifying an event in a first content item. The environment comprises a smartphone 100, though any suitable computing device may be used. The smartphone 100 receives a first content item 102 via, for example, a network such as the internet. The network may comprise wired and/or wireless means. In this example, the first content item 102 comprises a cricket game and is generated for display at the smartphone 100. In this example, the first content item 102 is monitored to identify a change in viewer numbers (i.e., factor that is being monitored is viewer numbers) of the first content item and a graph 104 is displayed at the smartphone 100. Although the graph 104 is shown in this example, the graph 104 is optional and may not always be present. A change in the viewer numbers that is greater than a threshold value is indicated on the graph by circles and, in particular, by circle 106. The circles are selectable user interface elements that, on selection, generate a second content item 108 for display. The second content item 108 may comprise video, audio, text and/or an image. In this example, the second content item 108 comprises a thumbnail of a selectable replay 110 and descriptive text 112. In some examples, the second content item may comprise only the selectable replay 110 (or be the replay itself) or the descriptive text 112. The second content item 108 may be transmitted to the smartphone 100 via a network such as the internet. The second content item 108 may be transmitted as it is generated and stored locally at the smartphone 100 or, in other examples, the second content item 108 may be transmitted in response to an input that is received via, for example, circle 106.

Figure 2:
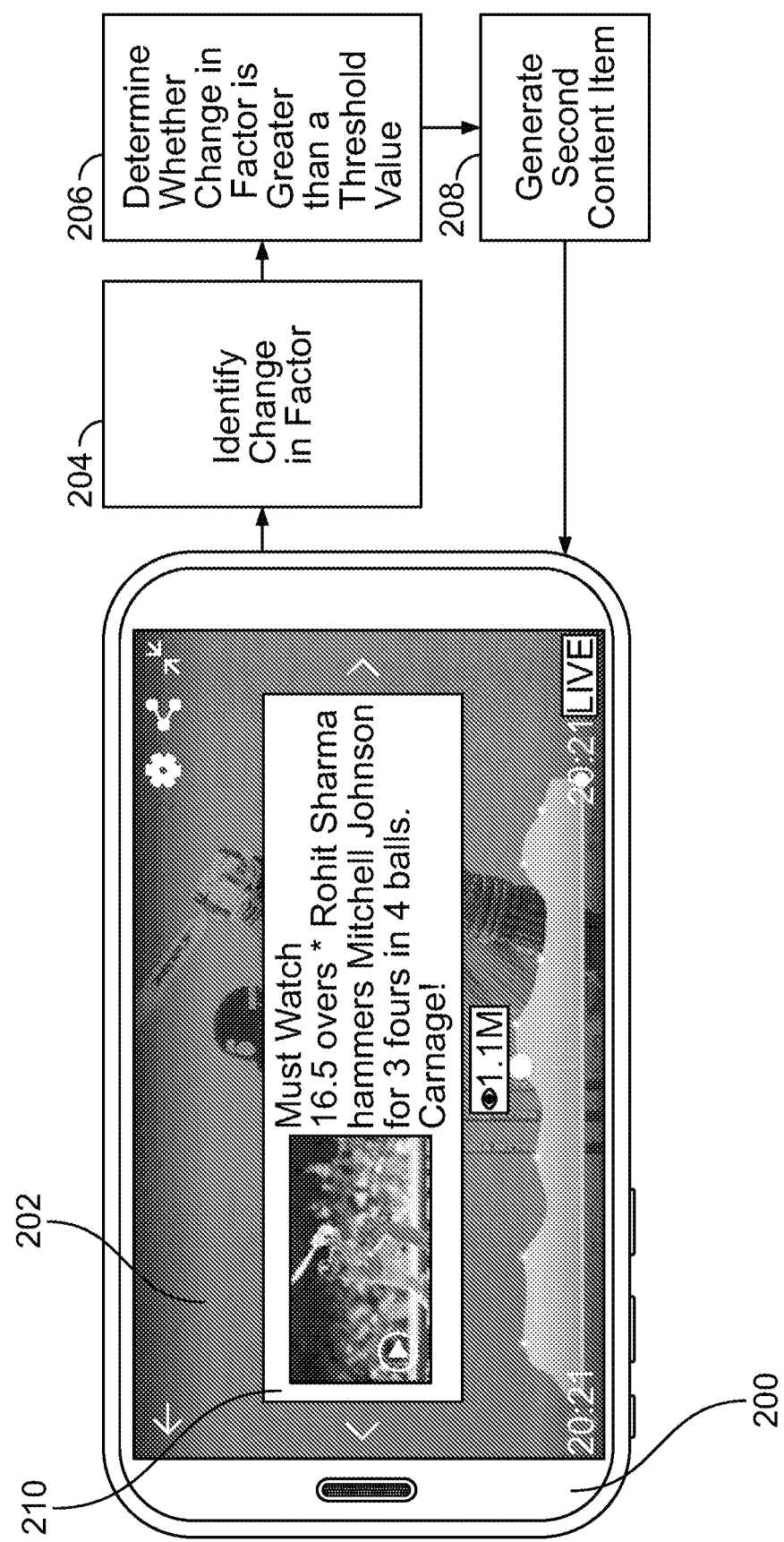
FIG. 2 shows another example environment in which a second content item is generated for display on identifying an event in a first content item.

FIG. 2 shows another example environment in which a second content item is generated for display on identifying an event in a first content item. In a similar manner to the environment shown in FIG. 1, the environment comprises a smartphone 200, which receives a first content item 202 via a network, such as the internet, and generates the first content item 202 for display at a display of the smartphone 200. At 204, a change in factor associated with the first content item is identified. The content item 202 may be monitored at a server to identify a change in factor greater than a threshold value. In another example, the monitoring may be performed locally, at the computing device, via a trained algorithm. The algorithm may be trained to identify a relevant factor in order to aid with identifying an event. In some examples, the computing device may comprise an artificial intelligence accelerator chip, such as a Google Tensor chip or a Samsung Exynos chip to aid with factor analysis. In some examples, the content item may be monitored substantially in real time, such that any events that occur in the content item are identified with only a short delay. The factor may be any suitable factor for identifying an event in a content item. In some examples, a suitable factor may be identified manually and/or be indicated by a selectable setting. The factor may be identified by, for example, a broadcaster, a commentator and/or a viewer. In other examples, a trained algorithm, such as a trained neural network, may track a vast number of different inputs and use machine learning to identify optimal inputs for identifying an event. The factors used for identifying an event may evolve with time, for example, over the duration of a content item. For example, a crowd may respond enthusiastically at the beginning of a game, but by the end of a game respond less enthusiastically. In this example, crowd noise may be less useful for identifying an event, so other factors may need to be considered. In some examples, a mutual information quadratic unconstrained binary optimization method can be implemented to identify the best inputs. Once a suitable factor, or factors, has been identified, the factor, or factors, is monitored to identify changes in the factor, or factors. For example, data relating to the factor may be graphed, and peaks and troughs in the graph may be identified. A rate of change in the graphed data may also be identified. Any identified peaks, troughs and/or rate of change in the graphed data may be compared to a threshold value to determine whether the change in factor is greater than a threshold value 206.

In some examples, a normal distribution is utilized to aid in determining whether the change in the factor is greater than a threshold value. For example, the number of events having a certain strength (e.g., based on the magnitude of the factor associated with the event), or range of strengths, can be plotted against a strength of an event to produce a graph. In some examples, this graph is a normal distribution. In some examples, the threshold value can be adjusted based on the desired number of events. If the change in the factor is greater than the threshold value, a second content item 208 is generated. The second content item 208 may comprise video, audio, text and/or an image. The second content item 208 may be generated for display at a server and may be transmitted to the smartphone 200. In some examples, the first content item 202 and the second content item 208 may be transmitted from the same server. In other examples, they may be transmitted from different servers. The servers may be the same, or different, physical and/or virtual servers. In another example, the second content item 208 may be generated at the smartphone 200 itself. In some examples, the second content item 208 may be generated by saving a portion of the first content item for display. In other examples, data may be retrieved via, for example, the internet and may be used to generate the second content item for display. For example, a sports database website may be scraped in order to generate the second content item for display. On receipt of an input associated with a selectable user interface element, the second content item 210 is generated for display at the computing device. The second content item 210 may be transmitted to the smartphone 200 via a network such as the internet. The second content item 210 may be transmitted as it is generated and stored locally at the smartphone 200 or, in other examples, the second content item 210 may be transmitted in response to a received user input.

Figure 3:
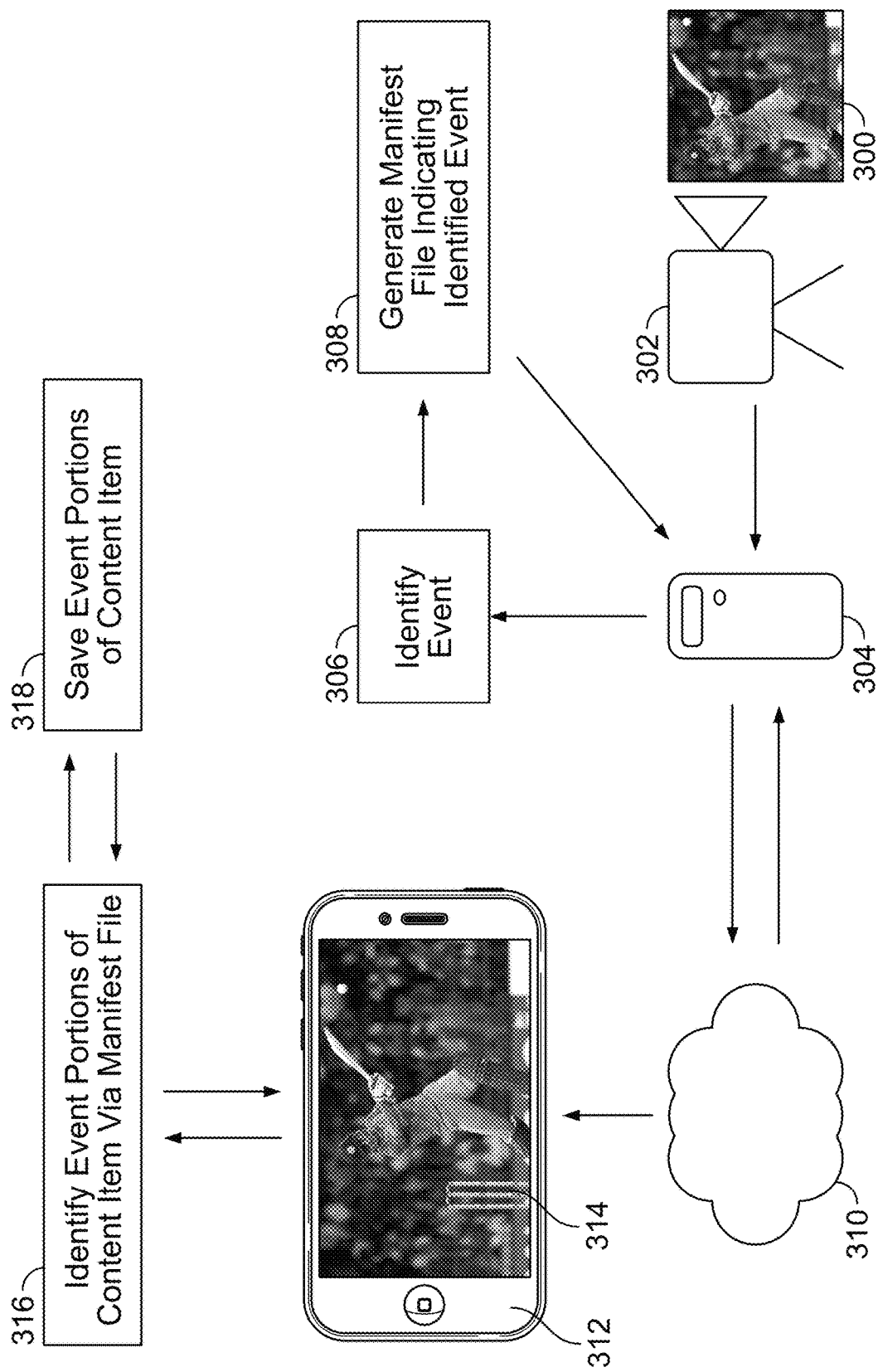
FIG. 3 shows another example environment in which a second content item is generated for display on identifying an event in a first content item.

FIG. 3 shows another example environment in which a second content item is generated for display on identifying an event in a first content item. The environment comprises a game 300, a camera 302, a server 304 and a smartphone 312. The camera 302 may be any suitable capture device. For example, the camera 302 may comprise a capture device for capturing three-dimensional content or virtual reality content and/or a virtual capture device for capturing virtual content in, for example, the metaverse. The camera 302 captures at least a part of the game 300 and creates a first content item, comprising the capture from the camera 302, which is transmitted via a network (not shown), such as the internet, to server 304. In some examples, the server 304 is located locally to the camera 302; in other examples, the server 304 is located remote from the camera 302. In this example, an event is identified 306 at the server 304, in the first content item, in any manner described herein. A manifest file is generated at the server 304. The manifest file comprises one or more links that enables a computing device, such as smartphone 312, to request segments of the first content item from a server in order to generate them for display. For example, if the first content item is an MPEG-DASH content item, then the smartphone 312 may receive the first content item in segments. In some examples, the first content item is transmitted to the smartphone 312 via server 304. In other examples, the first content item is transmitted to the smartphone 312 via a different physical, or virtual, server. In addition, the generated manifest file indicates which segments of the first content item are related to an event and should be, for example, saved at the computing device, such as smartphone 312. In some examples, a new manifest file is generated and transmitted to the smartphone in response to each identified event. In other examples, a new manifest file may be generated after a threshold number of events are identified, for example two, three, five or ten events. The manifest file is transmitted via a network 310, such as the internet, to the smartphone 312. The smartphone 312 utilizes the manifest file to request the first content item and generates it for display 314. At the computing device, the manifest file is processed, and the segments of the first content item that are relevant to the event are identified 316. On identifying the relevant segments of the first content item, the relevant segments are saved 318, thereby creating a second content item. If, for example, an input is received via a user interface element at the smartphone 312 corresponding to the identified event, the second content item is generated for display.

Identifying the event 306 may comprise analyzing the first content item via a video and/or audio analysis module, which shares the identification of an event with a manifest generation service, which generates 308 the manifest file. The first content item may comprise a plurality of segments. A collection of consecutive segments associated with the event may be tagged in the manifest for a player running on the smartphone 312 to save them as individual clips (i.e., a clip consists of several consecutive segments identified in the manifest), thereby generating a plurality of second content items. In an example of streaming a live game, such as game 300, the manifest file for the stream of the live game may be constantly updated. Old media uniform resource indicators (URLs) are removed and new URLs are added as they become available, i.e., after being transcoded and available for a media player running on the smartphone 312 to request them (e.g., via GET request) from, for example, an edge server. The media player running on the smartphone 312 may be instructed, via the received manifest file, to store specific consecutive segments of the first content item. Such segments may be sent to a decoder buffer at the smartphone 312 for decoding, displayed and, in some examples, stored (or digitally recorded) to form a clip (i.e., a second content item) of an identified event. In some examples, the manifest file may comprise a tag (e.g., ALLOW_STORE_ENABLE) that acts as an instruction to a media player running on the smartphone 312. Such tag may apply to certain segments of the first content item (e.g., segments between the ALLOW_STORE_ENABLE and ALLOW_STORE_DISABLE tags). This enables the creation of video clips (i.e., second content items) related to identified events if, for example, the video and/or audio analysis module (e.g., when the first content item is ingested) is able to identify the event before the updated manifest with the event, or the beginning of the event, is transmitted to the smartphone 312. This may require detecting the beginning of an event that is represented by at least one segment, so that it can be indicated, via the manifest file, to the media player running on the smartphone 312 to store the segments. Similarly, the name of the event can be signaled via, for example, the manifest file, and used by a file directory on the smartphone 312 to generate and/or select an icon and/or text for the second content item. For example, an icon and/or text may represent a type of event, such as a first icon for a touchdown, and a second icon for a field goal. A dedicated portion of the memory available on the smartphone 312 may be reserved for such saving and linking icons to specific files (i.e., second content items) that represent the event.

Figure 4:
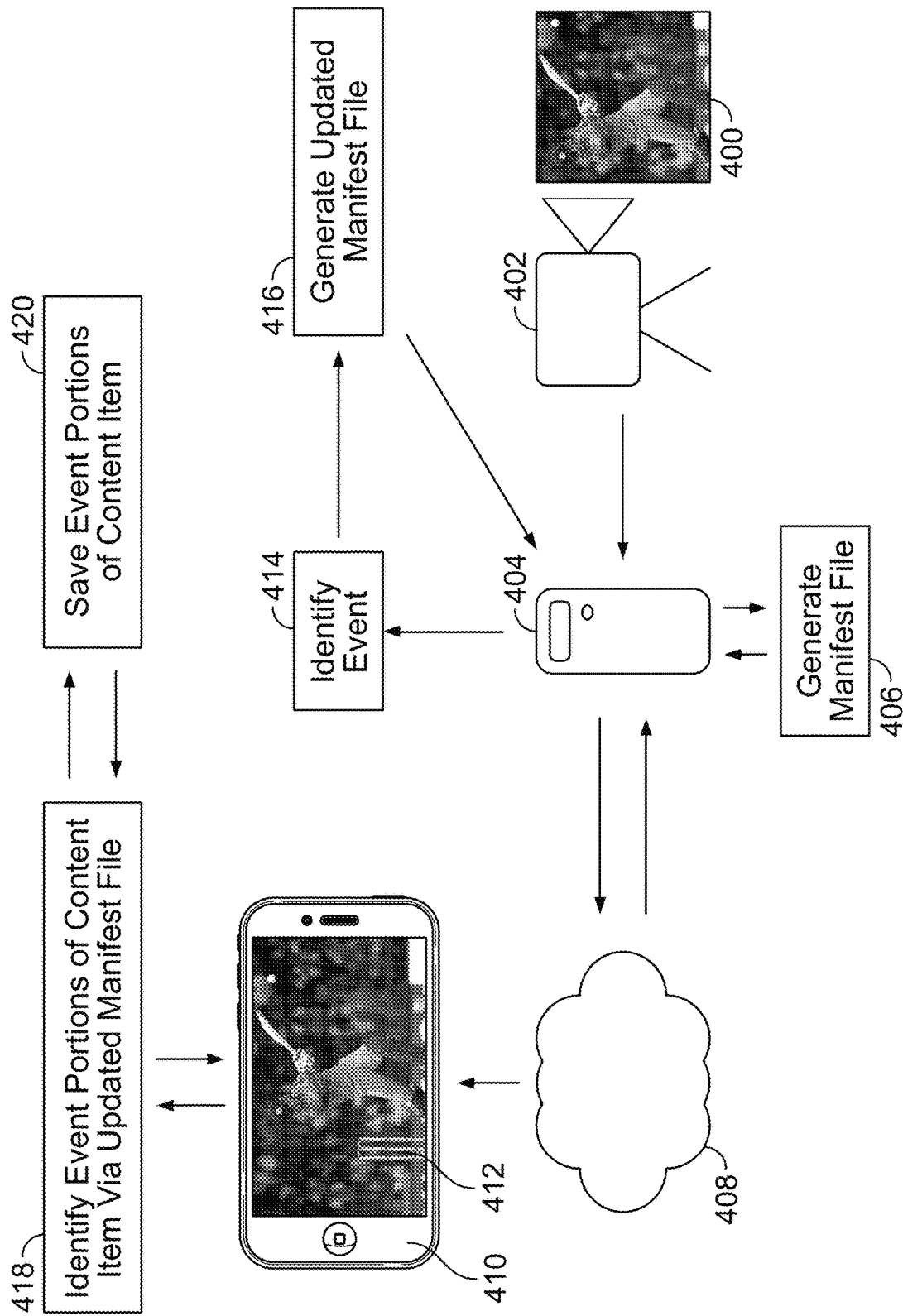
FIG. 4 shows another example environment in which a second content item is generated for display on identifying an event in a first content item.

FIG. 4 shows another example environment in which a second content item is generated for display on identifying an event in a first content item. In a similar manner to the environment depicted in FIG. 3, the environment comprises a game 400, a camera 402, a server 404 and a smartphone 410. The camera 402 captures at least a part of the game 400 and creates a first content item, comprising the capture from the camera 402, which is transmitted via a network (not shown), such as the internet, to server 404. In this example, a first manifest file is generated 406 at the server 404. The first manifest file is transmitted via a network 408, such as the internet, to the smartphone 410. The smartphone 410 utilizes the first manifest file to request the first content item and generates it for display 412. In this example, an event is identified 414 at the server 404, in the first content item, in any manner described herein. In other examples, this identifying may take place at a second server that is physically, or virtually, different from the server 404. On identifying the event, an updated manifest file is generated 416 indicating the segments of the first content item that are relevant to the event. The updated manifest 416 is transmitted via the network 408 to the computing device 410. At the computing device, the updated manifest file is processed, and the segments of the first content item that are relevant to the event are identified 418. On identifying the relevant portions, the relevant portions are requested, from the server 404, via the network 408. On receiving the requested segments, the smartphone 410 saves 420 the requested segments, thereby creating a second content item. If, for example, an input is received via a user interface element at the smartphone 410 corresponding to the identified event, the second content item is generated for display.

The one or more second content items, based on one or more identified events, may be created in near-real time when the manifest file does not comprise information regarding an event or an instruction to store a portion of the segments of the first content item. For example, the detection of an event, or the start of an event, can occur after a manifest file has been transmitted to a media player running on the smartphone 410, and newly received segments of the first content item are not tagged for storing in the manifest file. An updated manifest file can be generated 416 by, for example, a manifest creation service that tags segments already transmitted to the smartphone 410 by re-including such segment(s) in the manifest file with, for example, a STORE_ONLY tag. This enables a media player running on the smartphone 410 to fetch the segment(s) for storing, but not for decoding and/or display. In some examples, a hybrid mode may enable a media player running on the smartphone 410 to store and create a video clip (i.e., a second content item) when the information is available in the manifest file. The server 404 may create the video clip (i.e., the second content item) when the identification of the event is known after the manifest file is transmitted to a media player running on the smartphone 410 and segments related to the identified event are already referenced in the received manifest file.

Figure 5:
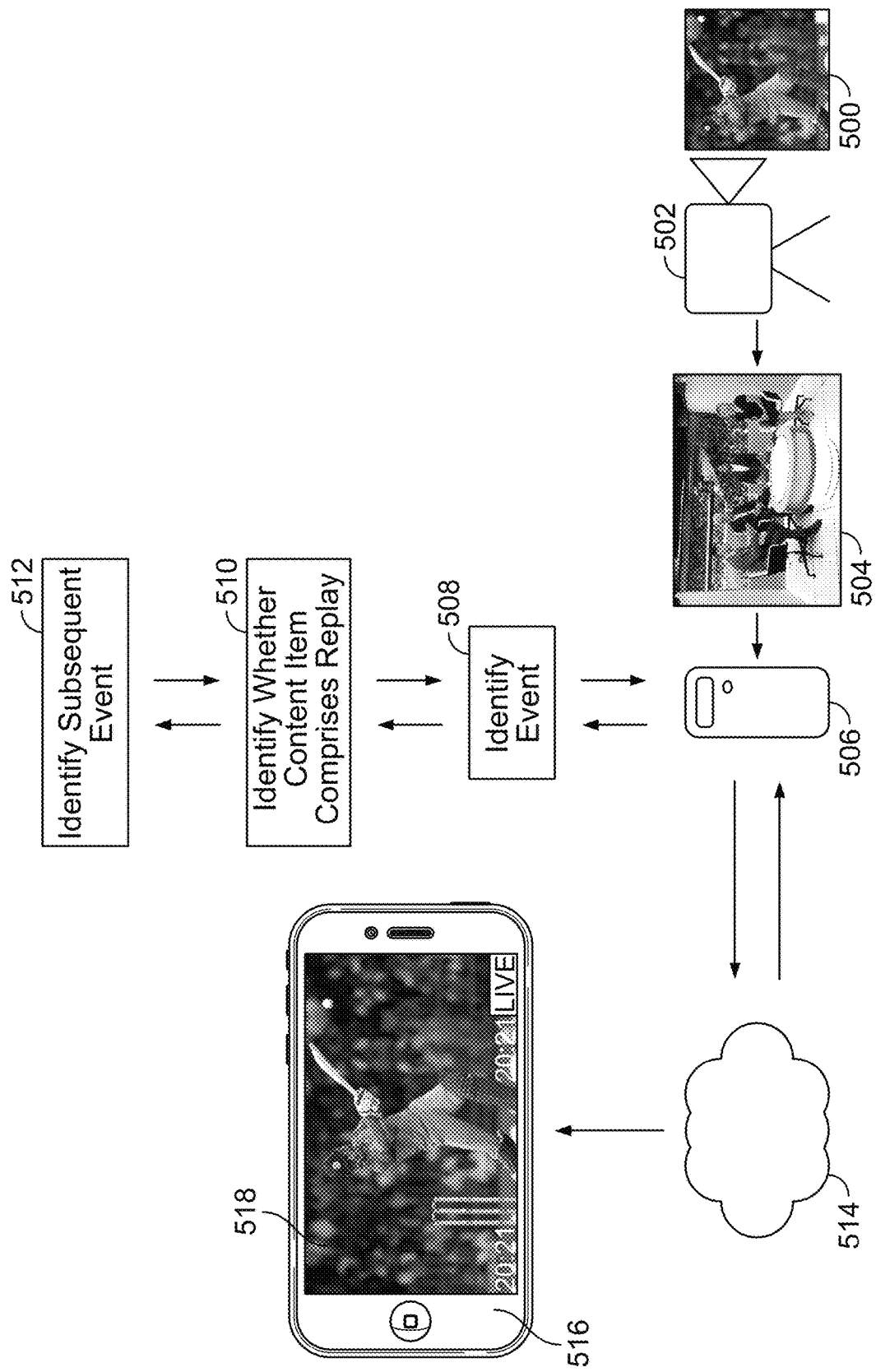
FIG. 5 shows another example environment in which a second content item is generated for display on identifying an event in a first content item.

FIG. 5 shows another example environment in which a second content item is generated for display on identifying an event in a first content item. In a similar manner to the environments depicted in FIGS. 3 and 4, the environment comprises a game 500, a camera 502, a server 506 and a smartphone 516. In addition, the environment comprises a commentary studio 504, where commentators typically commentate on the game 500, generate replays, including slow-motion replays, of the game 500, analyze plays in the game 500, and/or annotate plays from the game 500. The camera 502 captures at least a part of the game 500 and creates a first content item, comprising the capture from the camera 502, that is transmitted via a network (not shown), such as the internet, to a server. In addition, a camera, which may be the same, or a different, camera from the camera 502 captures at least a part of the commentary studio 504. The commentary studio may receive all, or parts, of the capture of the game 500 and may generate subsequent captures, for example with respect to replays and/or annotations, in the manner described. The captures of the game 500, the commentary studio 504 and any additional captures are combined, for example in a television production studio, to create a first content item, and the first content item is transmitted via a network, such as the internet, to server 506. In some examples, one or more replays may additionally, or alternatively, be introduced at the television production studio. Server 506 may be the same server as the aforementioned server or may be a different server from the aforementioned server. At the server 506, an event is identified 508, in the first content item, in any manner described herein. After an event is identified, the server monitors the first content item to identify 510 whether the first content item comprises a replay. If it is identified that the first content item comprises a replay, the server 506 stops monitoring the first content item for an event, for the duration of the reply. After the server 506 identifies that the reply has finished, the server 506 optionally resumes monitoring the first content item and optionally identifies 512 one or more subsequent events. A manifest file, indicating the identified event(s), is transmitted via a network 514, such as the internet, to the smartphone 516, where it is used to request the first content item and generate it for display 518.

Determining when the first content item comprises a replay of an event enables the avoidance of using resources to analyze the frames and/or storing the segments of the first content item associated with a replay. This is desirable, because it is likely that a second content item will already have been generated based on the first time that event occurred in the first content item. Typically, replays occur a short time after an event but, in some examples, can occur later during the stream of a game as well. Replays may comprise repeated segments (e.g., their file names may indicate an earlier sequence than the most recent numbers) of the first content item. Based on detecting a repeated segment, the repeated segments may not be reanalyzed to detect one or more events. This information may also be available to an encoder when a first content item is re-ingested from a broadcaster. Similarly, replays may be identified by detecting slow motion (i.e., a reduced frame rate) in the first content item and/or detecting on-screen annotations (e.g., arrows being drawn by announcers) in the first content item.

Figure 6:
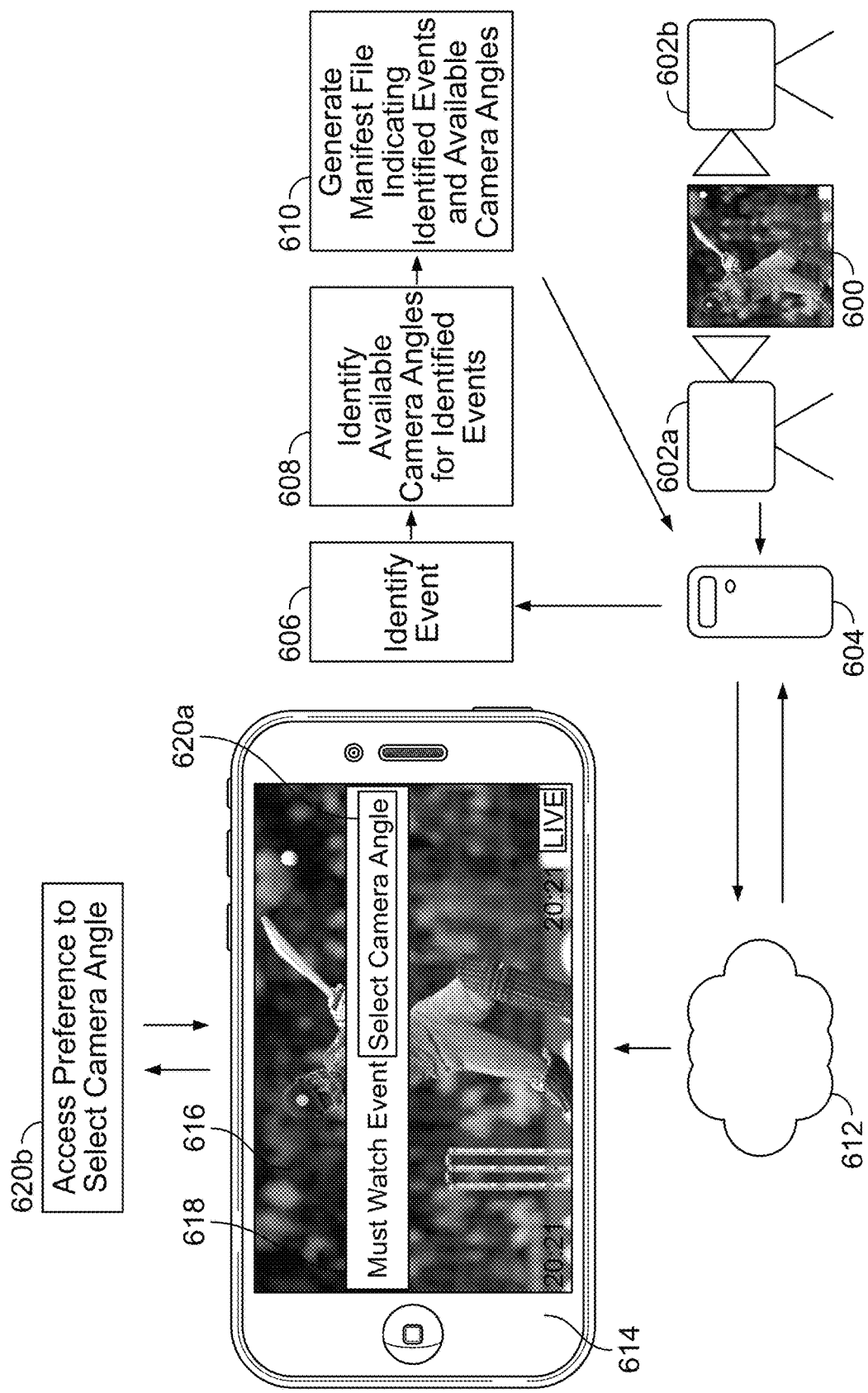
FIG. 6 shows another example environment in which a second content item is generated for display on identifying an event in a first content item.

FIG. 6 shows another example environment in which a second content item is generated for display on identifying an event in a first content item. In a similar manner to the environments depicted in FIGS. 3-5, the environment comprises a game 600, a first camera 602a, a server 604 and a smartphone 614. In addition, the environment comprises a second camera 602b. The cameras 602a and 602b capture at least a part of the game 600 and create content items, comprising the captures from the cameras 602a, 620b that are transmitted via a network (not shown), such as the internet, to server 604. The content items are combined, for example at a television production studio, to create a first content item at server 604. In some examples, a first server receives the captures from the first and second cameras 602a, 602b and a second server is used to combine the captures. At server 604, an event is identified 606 in the first content item. For each identified event, available camera angles are identified 608. At 610, a manifest file indicating the identified events and available camera angles is generated. The manifest file is transmitted via a network 612, such as the internet, to the smartphone 614. The smartphone 614 utilizes the first manifest file to request the first content item and generates it for display 616. At the computing device, the updated manifest file is processed, and the segments of the first content item that are relevant to the event are identified. On identifying the relevant portions, a user interface element 618 is generated for display. In one example, the user interface element comprises a selectable element, "Select Camera Angle" 620a, which enables the selection of a camera angle via an input. In another example, a preference to select a default camera angle may be set 620b. For example, this preference may be set in an OTT application settings menu. In another example, the preference may be set via, for example, associating the setting with a user profile for an OTT service via, for example, a website accessible via a web browser. On receiving the user input, or accessing the preference, the smartphone 614 requests the second content item, as indicated in the manifest file, comprising portions of the first content item having the selected camera angle.

FIG. 7 shows a portion of an example data structure for use in generating a second content item for display on identifying an event in a first content item. The data structure 700 reflects a portion of a typical manifest file that may be used for indicating to a computing device that more than one camera angle is available for a portion of a stream. The data structure 700 may indicate a name associated with a camera angle of a video stream, for example "overhead" 702a, "highsky" 702b or "skycam" 702c. The data structure 700 may also indicate whether the camera angle should be automatically selected 704 and/or whether it should be the default 706 camera angle, for example, where no selection is received and/or no preference is set. The data structure 700 may also comprise one or more uniform resource identifiers (URI) 708a, 708b for accessing each of the streams associated with the camera angles. The URIs may be absolute or relative links.

In a case where a first content item being streamed to a media player running on a computing device corresponds to a different camera angle than indicated via a preference, then video clip (i.e., second content item) creation can occur, for example, in the cloud. This enables the media player to ignore streams/content items comprising camera angles not needed for playback and/or display. In some examples, the number of camera angles is limited (e.g., by the physical number of cameras capturing a game), and therefore the generation of a video clip (i.e., second content item) that represents an event can also be made available to other computing devices that indicate the same preference (e.g., replay preferred using a high-sky camera angle). A preference can also include different camera angles for different events (e.g., skycam for a first type of event, highsky for a second type of event).

In another example, a server may comprise a dedicated video clip or replays creation service that has access to user profiles associated with an OTT service. The user profiles may comprise preferences for second content item formats and may be utilized to determine ahead of time that only certain events need to be stored in specific formats (e.g., camera angles). The service may utilize available manifest files to request and create a video for a given key play.

Figure 8:
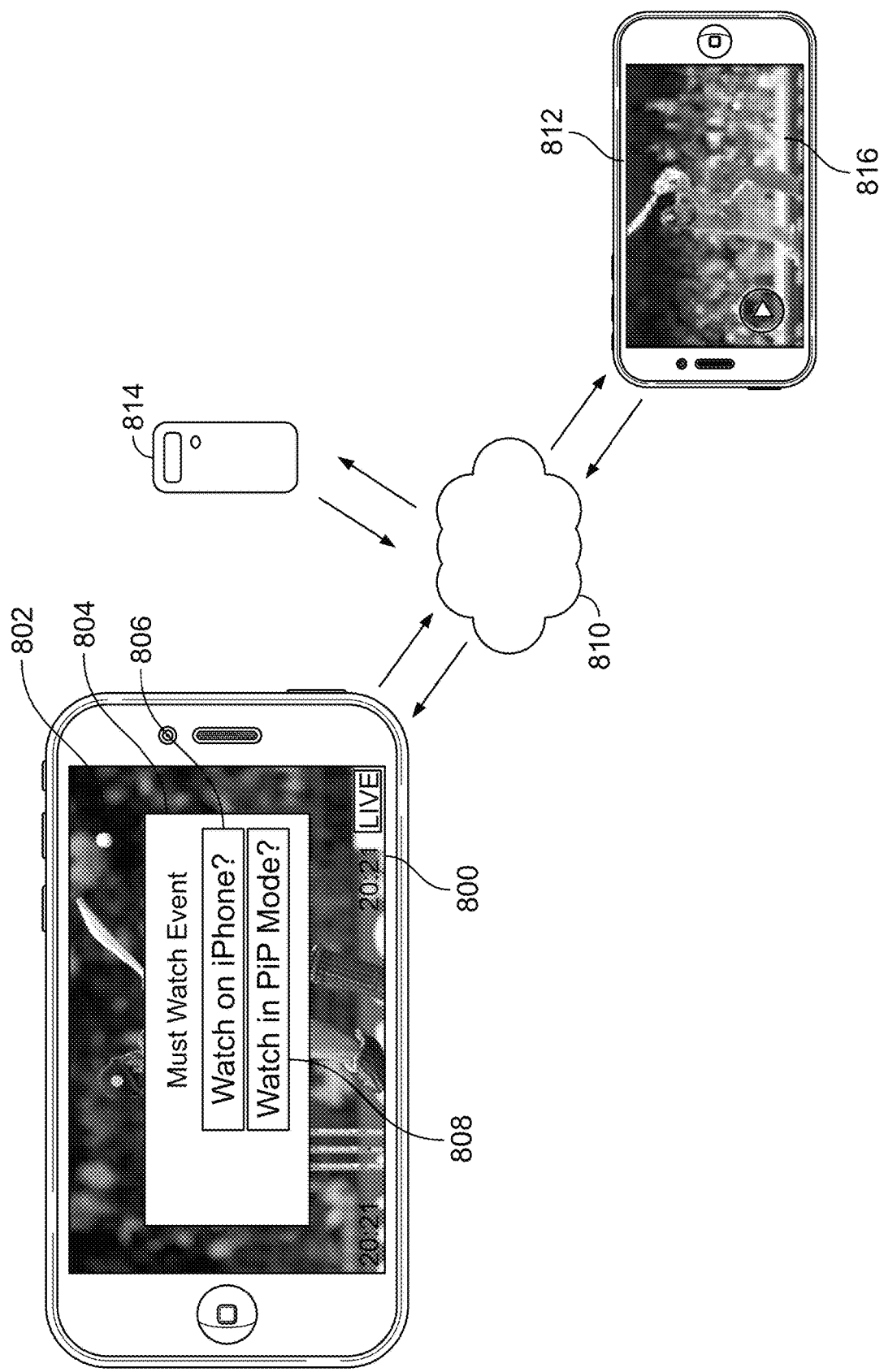
FIG. 8 shows another example environment in which a second content item is generated for display on identifying an event in a first content item.

FIG. 8 shows another example environment in which a second content item is generated for display on identifying an event in a first content item. A smart television 800 receives a first content item 802. In other examples, the smart television 800 can be any suitable computing device. A user interface element 804 is generated for display at the smart television 800, giving an option 806 "Watch on iPhone," to watch a second content item (as received and described herein) relating to an identified event on, for example, an iPhone and/or an option 808 "Watch in PiP Mode," to watch a second content item relating to an identified event in Picture in Picture (PiP) Mode. Either, or both, options may be displayed at the smart television 800. The option 806 to watch an identified event on an iPhone may refer to any suitable computing device instead of an iPhone. In some examples, multiple suitable computing devices may be presented as options. In some examples, user interface element 804 indicates any computing device that is paired with the smart television 800 via, for example, Bluetooth and/or Wi-Fi. On receiving an input selecting "Watch on iPhone," data indicating the selection is transferred via a network 810, such as the internet, to iPhone 812. For example, the iPhone 812 may be running an OTT application that receives the request. The iPhone 812 may transmit the request via network 810 to a server 814. The server may transmit a manifest file and/or the second content item to the iPhone 812, where it is generated for display. In addition to the arrangement described herein, any known method of displaying the second content item on a second computing device, such as the iPhone 812, is contemplated. For example, the second content item may be received at smart television 800 and may be transmitted directly to a second computing device, such as the iPhone 812. In another example, the smart television 800 may transmit a manifest file to a second computing device, such as the iPhone 812, enabling it to request the second content item. In another example, the smart television may transmit the request to server 814, with which the iPhone 812 is registered, and the server 814 may push the second content item to the iPhone 812.

Server 814 may comprise a replay creation service that may further process the first content item and/or a generated second content item to make it available so that it can be played on one or more secondary computing devices (e.g., an iPhone). This enables a second content item, such as a generated replay, to be consumed on a secondary computing device if, for example, only a subset of viewers at a primary computing device, such as a smart television, wish to watch the second content item. In another example, second content items such as replays may be played in PiP mode. For example, selecting an icon associated with an event on a progress bar, or transport bar, of a media player running on a computing device, such as a smart television, can generate a list of secondary computing devices to play the second content item on. In some examples, this is equivalent to casting (e.g., via Google Chromecast and/or Apple Airplay) when the devices are on the same network.

Figure 9:
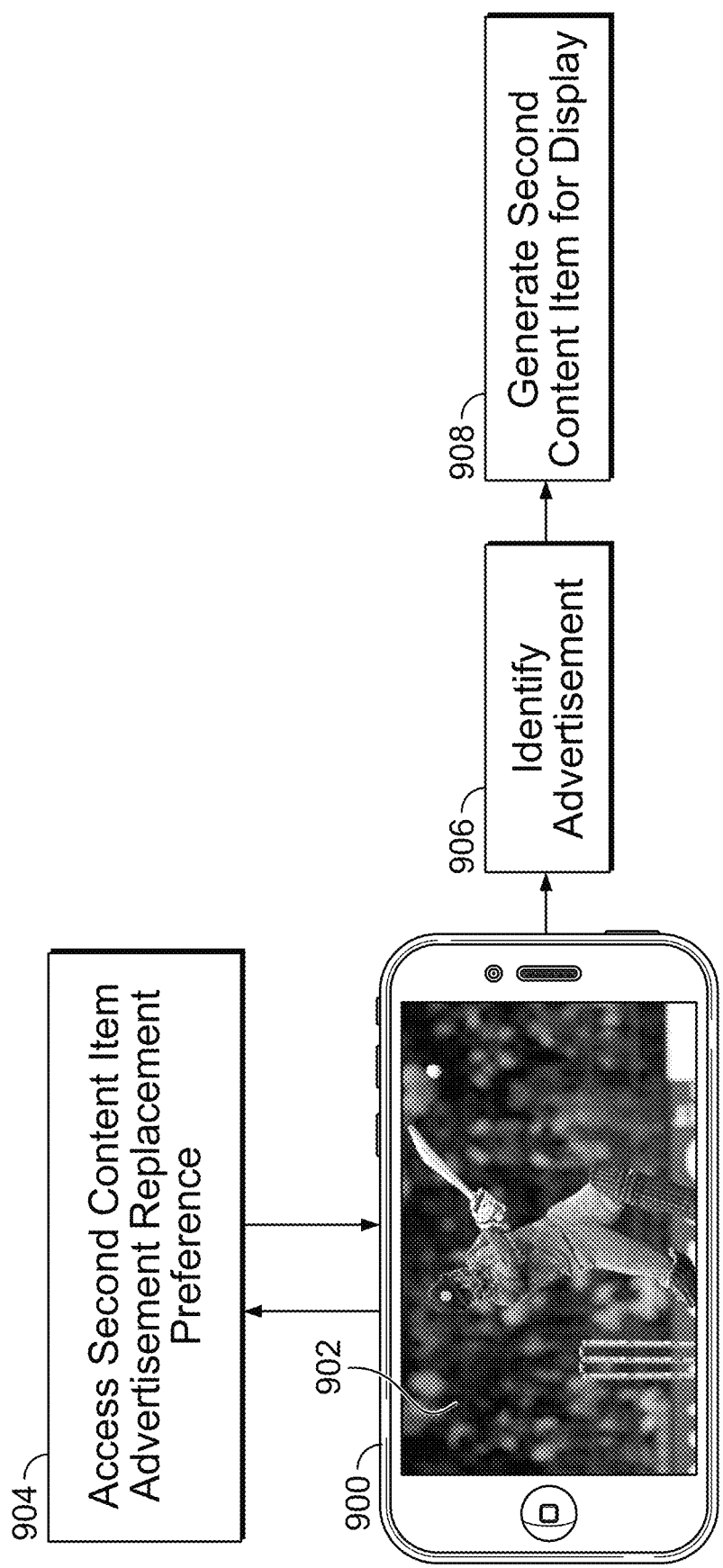
FIG. 9 shows another example environment in which a second content item is generated for display on identifying an event in a first content item.

FIG. 9 shows another example environment in which a second content item is generated for display on identifying an event in a first content item. A smartphone 900 receives a first content item 902. The smartphone 900 may be any suitable computing device. The smartphone 900 also receives a second content item, relating to an identified event, in any manner described herein. The smartphone 900 accesses 904 a preference with respect to advertisement replacement. For example, this preference may be set in an OTT application settings menu. In another example, the preference may be set via, for example, associating the setting with a user profile for an OTT service via, for example, a website accessible via a web browser. If the setting indicates that the second content item should replace an advertisement, the smartphone may store the second content item in a cache, until an advertisement is identified 906. In another example, where the second content item and the advertisement each comprise a plurality of segments, at least a subset of the segments of the second content item are requested instead of at least a subset of the segments of the advertisement in response to the setting indicating that the second content item should replace an advertisement. An advertisement may be identified via a webservice, a trained algorithm and/or metadata associated with the advertisement. On identifying an advertisement, the second content item is generated for display 908 at the smartphone 900. The second content item may replace a part of the advertisement or the entire advertisement. The second content item may also replace more than one advertisement (or parts of advertisements). The second content item may be trimmed to match the length of one (or multiple) advertisements if, for example, the length of an advertisement is known via, for example, a webservice and/or metadata associated with the advertisement. In some examples, even if a preference is set, some advertisements may not be replaced if, for example, a specific tag and/or advertising marker is set, indicating that the advertisement may not be replaced.

The second content item, for example, the most recently available second content item, may be automatically played in response to detecting a transition in the first content item from, for example, main content, such as a game, to an advertisement. An advertisement may be identified via the use of a tag and/or an advertisement marker via an adaptive streaming standard (e.g., DASH and/or HLS).

Figure 10:
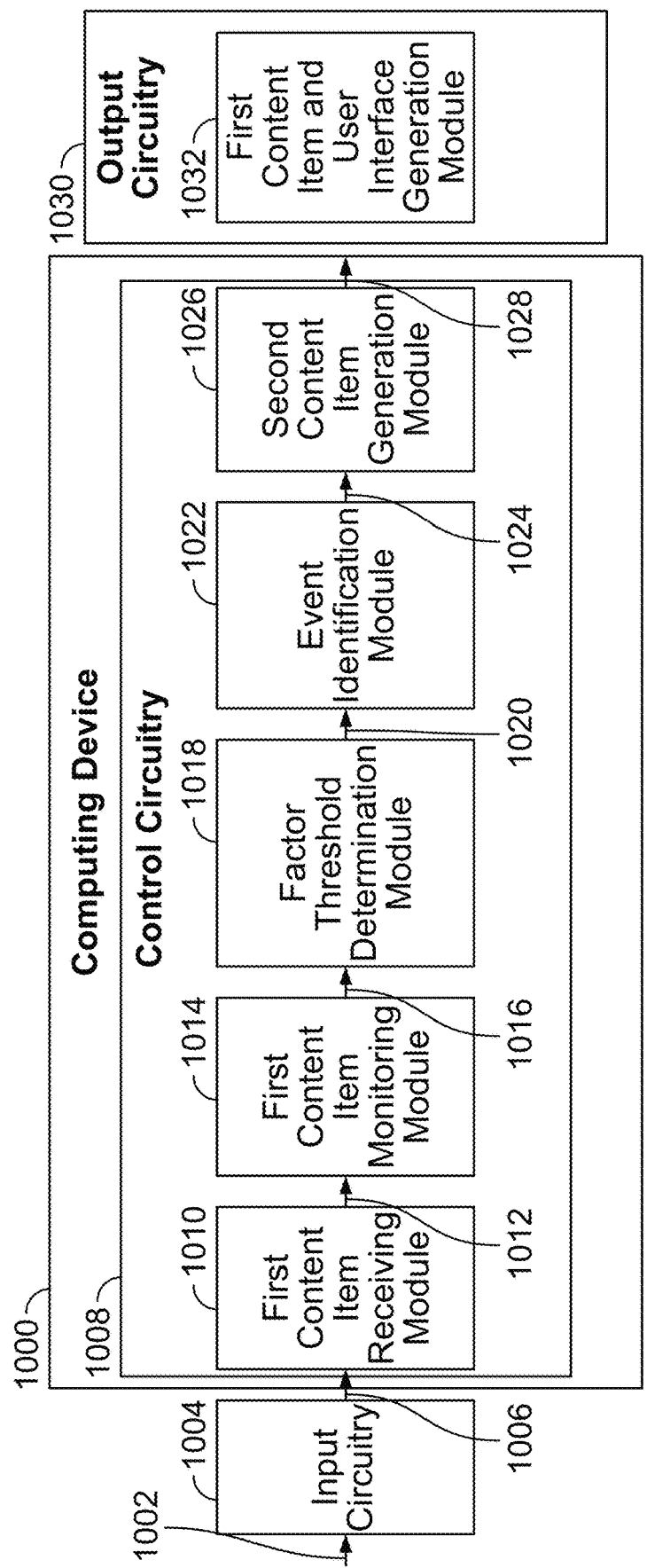
FIG. 10 shows a block diagram representing components of a computing device and data flow therebetween for generating a second content item for display on identifying an event in a first content item.

FIG. 10 shows a block diagram representing components of a computing device and data flow therebetween for generating a second content item for display on identifying an event in a first content item. Computing device 1000 (e.g., server 304, 404, 506, 604, 814) as discussed above comprises input circuitry 1004 and control circuitry 1008. Output module 1030, comprising output circuitry, may be part of a second computing device (e.g., computing device 100, 200, 312, 410, 516, 614, 800). Control circuitry 1008 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received by the input circuitry 1004. The input circuitry 1004 is configured to receive inputs related to a computing device. For example, this may be via a touchscreen, keyboard, mouse, microphone, infra-red controller, Bluetooth and/or Wi-Fi controller of the computing device 1000. In another example, the input may comprise instructions received via another computing device. The input circuitry 1004 transmits 1006 the user interface input to the control circuitry 1008.

The control circuitry 1008 comprises a first content item receiving module 1010, a first content item monitoring module 1014, a factor threshold determination module 1018, an event identification module 1022 and a second content item generation module 1026. The user interface input is transmitted 1006 to the first content item receiving module 1010. At the first content item receiving module 1010, a first content item is received. The first content item is transmitted 1012 to the first content item monitoring module 1014, where the first content item is monitored to identify a change in one or more factors associated with the first content item. The monitored factors are transmitted 1016 to the factor threshold determination module 1018, where it is determined whether a change in a factor is greater than a threshold value. On identifying that a change in a factor is greater than a threshold value, an indication is transmitted 1020 to the event identification module 1022, where an event is identified in the first content item. Data indicating the event is transmitted 1024 to the second content item generation module 1026, where a second content item is generated. The second content item is transmitted 1028 to the output module 1030, comprising output circuitry. In some examples, the second content item is transmitted via a network, such as the internet, to a second computing device comprising the output module 1030. The first content item may also be transmitted via the network to the second computing device. At the output module 1030, the first content item and a user interface element are generated for output by the first content item and user interface element generation module 1032. On receiving an input at the user interface element, the second content item is generated for output at the output module 1030.

Figure 11:
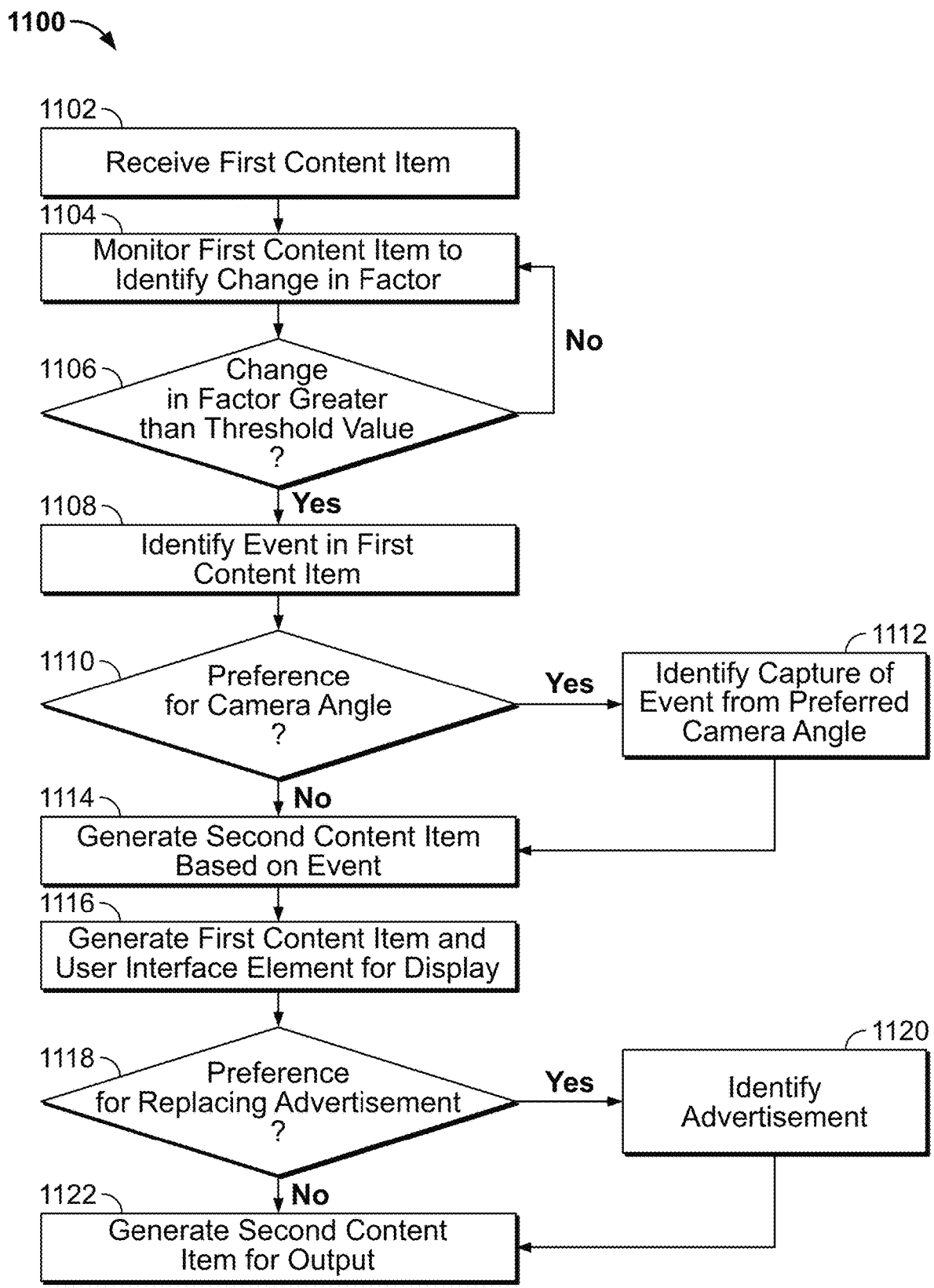
FIG. 11 shows a flowchart of illustrative steps involved in generating a second content item for display on identifying an event in a first content item.

FIG. 11 shows a flowchart of illustrative steps involved in generating a second content item for display on identifying an event in a first content item. Process 1100 may be implemented on any of the aforementioned computing devices (e.g., computing device 100, 200, 312, 410, 516, 614, 800, 900, 1000). In addition, one or more actions of the process 1100 may be incorporated into or combined with one or more actions of any other process or embodiments described herein.

At 1102, a first content item is received, for example at a server, a smartphone, a smart television or a tablet. At 1104, the first content item is monitored to identify a change in a factor associated with the first content item. At 1106, it is determined whether a change in the factor is greater than a threshold value. If it is not greater than the threshold value, the first content item continues to be monitored. If it is greater than the threshold value, an event is identified in the first content item at 1108. At 1110, it is determined whether there is a preference for a particular camera angle. If there is a preference, a capture of the event from the preferred camera angle is identified at 1112 and, at 1114, a second content item is generated based on the event. If there is not a preference, a default camera angle is used and, at 1114, a second content item is generated based on the event. At 1116, the first content item and a user interface element are generated for display. At 1118, it is identified whether there is a preference for replacing an advertisement with the second content item. If there is a preference to replace an advertisement, an advertisement is identified at 1120, and the second content item is generated for output at 1122. If there is not a preference, the second content item, or an advertisement, is generated for output at 1122. In some examples, even if a preference is set, some advertisements may not be replaced if, for example, a specific tag and/or advertising marker is set, indicating that the advertisement may not be replaced.

In some examples, a progress bar (or transport bar) of a media player running on a computing device may indicate the availability of one or more second content items that are based on identified events in the first content item. These may be indicated in accordance with one or more preferences.

In some example systems, two events may be identified in close proximity to each other (e.g., there is a short amount of time between the end time of a first identified event and the start time of a second identified event). If the difference between the end time of a first identified event and the start time of a second identified event, the two events may be combined to generate a single additional content item based on both identified events. In some examples, the two events may be combined if it is determined that the difference between the end time of a first identified event and the start time of a second identified event is below a threshold value.

In some example systems, additional content items may be generated throughout a first content item, based on identified events. In some systems, additional content items that are generated at the beginning of a first content item may become less relevant as time progresses. For example, a touchdown that occurs at the beginning of a game may be less relevant at the end of a game. As some computing devices may have a limited amount of storage space to store generated content items, some generated content items may be automatically deleted. Criteria for deleting content items may be based on, for example, a number of views of the generated content item and/or an amount of time since the content item is generated. In some example systems, generated content items that are determined to be of a high relevance may be moved from a cache, or temporary storage, to a permanent storage. This permanent storage may be local storage or may be, for example, cloud storage accessible via a network, such as the internet. This analysis may be performed continuously, while the first content item is being streamed. In other examples, this analysis may be performed after the first content item has finished streaming and/or on a stop and/or pause event generated at a computing device.

In some example systems, the factor, or factors, used to identify events in a content item may take into account preferences indicated in a user profile. For example, a user profile may indicate a preference for a certain team, a certain player, a type of play such as batting, bowling, passing, running and/or controversial events, such as bad calls by a referee.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be example and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    receiving a first content item;
    monitoring the first content item to identify a first change in a first factor associated with the first content item;
    determining whether the first change in the first factor is greater than a threshold value;
    identifying, based on the first change in the first factor, an event in the first content item;
    generating a second content item, wherein the second content item is based on the identified event in the first content item;
    generating the first content item and a user interface element for display at a computing device, wherein the user interface element is configured to receive an input and is associated with the second content item;
    in response to receiving an input, generating the second content item for output;
    monitoring the first content item to identify a second change in a second factor associated with the first content item;
    identifying a replay of the event in the first content item; and
    stopping, based on the identifying of the replay and for the duration of the replay, monitoring the first content item to identify the second change in the second factor associated with the first content item.

2. The method of claim 1, wherein generating the second content item further comprises identifying, in a manifest file, at least one segment of the first content item for saving locally, the method further comprising:
    generating the manifest file, wherein the manifest file comprises:
        one or more links to one or more segments of the first content item; and
        a tag associated with at least one of the one or more links, wherein the tag indicates the segment may be locally saved; and
    receiving the manifest file at the computing device.

3. The method of claim 1, further comprising:
    receiving a manifest file at the computing device before the event in the first content item is identified, wherein the manifest file comprises one or more links to one or more segments of the first content item; and wherein:
        generating the second content item further comprises identifying, in an updated manifest file, at least one segment of the first content item for saving locally, the method further comprising:
            generating an updated manifest file, wherein the updated manifest file comprises a tag for indicating that at least a portion of the first content item may be locally saved; and
            receiving the updated manifest file at the computing device.

4. The method of claim 1, wherein generating the second content item further comprises identifying a third content item associated with the event, wherein the third content item comprises a capture of the event from a different camera angle from the first content item, and the second content item is based on the event in the third content item.

5. The method of claim 4, wherein a camera angle associated with the first content item and the third content item is identified via a manifest file received at the computing device.

6. The method of claim 1, further comprising:
    receiving a preference for a camera angle at the computing device; and wherein:
        the first content item comprises a capture of the event from a first camera angle, wherein the first content item comprises a tag indicating the first camera angle;
        identifying a third content item comprising a capture of the event from a second camera angle, wherein the third content item comprises a tag indicating the second camera angle;
        comparing the tags associated with each of the first and third content items to the preference;
        identifying one of the first and third content items based on the comparing; and wherein:
            generating the second content item further comprises generating the second content item based on the identified first or third content item.

7. The method of claim 1, wherein in response to receiving the input, the second content item is generated for display at a second computing device.

8. The method of claim 1, wherein:
in response to receiving the input, an advertisement is identified in the first content item; and
generating the second content item for output further comprises generating the second content item for output in place of at least a part of the identified advertisement.

9. The method of claim 1, wherein the event is identified via a trained computer algorithm.

10. A system comprising:
a communication port;
a memory storing instructions; and
control circuitry communicably coupled to the memory and the communication port and configured to execute instructions to:
receive a first content item;
monitor the first content item to identify a first change in a first factor associated with the first content item;
determine whether the first change in the first factor is greater than a threshold value;
identify, based on the first change in the first factor, an event in the first content item;
generate a second content item, wherein the second content item is based on the identified event in the first content item;
generate the first content item and a user interface element for display at a computing device, wherein the user interface element is configured to receive an input and is associated with the second content item;
in response to receiving an input, generate the second content item for output;
monitor the first content item to identify a second change in a second factor associated with the first content item;
identify a replay of the event in the first content item; and
stop, based on the identifying of the replay and for the duration of the replay, monitoring the first content item to identify the second change in the second factor associated with the first content item for the duration of the replay.

11. The system of claim 10, wherein:
the control circuitry configured to generate the second content item is further configured to identify, in a manifest file, at least one segment of the first content item for saving locally, and the control circuitry is further configured to:
generate the manifest file, wherein the manifest file comprises:
one or more links to one or more segments of the first content item; and
a tag associated with at least one of the one or more links, wherein the tag indicates the segment may be locally saved; and
receive the manifest file at the computing device.

12. The system of claim 10, wherein the control circuitry is further configured to:
receive a manifest file at the computing device before the event in the first content item is identified, wherein the manifest file comprises one or more links to one or more segments of the first content item; and wherein:
the control circuitry configured to generate the second content item is further configured to identify, in an updated manifest file, at least one segment of the first content item for saving locally; and the control circuitry is further configured to:
generate an updated manifest file, wherein the updated manifest file comprises a tag for indicating that at least a portion of the first content item may be locally saved; and
receive the updated manifest file at the computing device.

13. The system of claim 10, wherein the control circuitry configured to generate the second content item is further configured to identify a third content item associated with the event, wherein the third content item comprises a capture of the event from a different camera angle from the first content item, and the second content item is based on the event in the third content item.

14. The system of claim 13, wherein the control circuitry is further configured to identify a camera angle associated with the first content item and the third content item via a manifest file received at the computing device.

15. The system of claim 10, wherein the control circuitry is further configured to:
receive a preference for a camera angle at the computing device, wherein the first content item comprises a capture of the event from a first camera angle, and wherein the first content item comprises a tag indicating the first camera angle;
identify a third content item comprising a capture of the event from a second camera angle, wherein the third content item comprises a tag indicating the second camera angle;
compare the tags associated with each of the first and third content items to the preference;
identify one of the first and third content items based on the comparing; and wherein:
the control circuitry configured to generate the second content item is further configured to generate the second content item based on the identified first or third content item.

16. The system of claim 10, wherein in response to receiving the input, the control circuitry configured to generate the second content item for output is further configured to generate the second content item for display at a second computing device.

17. The system of claim 10, wherein:
in response to receiving the input, the control circuitry is further configured to identify an advertisement in the first content item; and
the control circuitry configured to generate the second content item for output is further configured to generate the second content item for output in place of at least a part of the identified advertisement.

18. The system of claim 10, wherein the control circuitry configured to identify the event is further configured to identify the event via a trained computer algorithm.

* * * * *